United States Patent
Kumagai

(10) Patent No.: US 7,895,169 B2
(45) Date of Patent: *Feb. 22, 2011

(54) DOCUMENT MANAGEMENT SYSTEM, DOCUMENT MANAGEMENT METHOD, PROGRAM AND STORAGE MEDIUM

(75) Inventor: Takekazu Kumagai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 57 days.

This patent is subject to a terminal disclaimer.

(21) Appl. No.: 12/436,108

(22) Filed: May 5, 2009

(65) Prior Publication Data

US 2009/0222607 A1   Sep. 3, 2009

Related U.S. Application Data

(63) Continuation of application No. 10/400,640, filed on Mar. 28, 2003, now Pat. No. 7,552,259.

(30) Foreign Application Priority Data

Apr. 19, 2002   (JP)   ............................... 2002-117791

(51) Int. Cl.
G06F 17/30 (2006.01)
G06F 7/00 (2006.01)

(52) U.S. Cl. ........................ 707/694; 707/758; 707/781
(58) Field of Classification Search ................. 707/758
See application file for complete search history.

(56) References Cited

U.S. PATENT DOCUMENTS

| 5,181,162 | A | 1/1993 | Smith et al. |
| 5,835,904 | A | 11/1998 | Vicik et al. |
| 6,134,584 | A * | 10/2000 | Chang et al. ................. 709/219 |
| 6,314,425 | B1 * | 11/2001 | Serbinis et al. .................... 1/1 |
| 6,584,551 | B1 | 6/2003 | Huber |
| 6,654,756 | B1 | 11/2003 | Quernemoen et al. |
| 6,854,016 | B1 | 2/2005 | Kraenzel et al. |

* cited by examiner

Primary Examiner—Tim T. Vo
Assistant Examiner—Sangwoo Ahn
(74) Attorney, Agent, or Firm—Fitzpatrick, Cella, Harper & Scinto

(57) ABSTRACT

In a document management system according to the present invention, which is used for registering and managing a document in a database of a relational database server, a judgment is made as to whether or not a capacity of the database has reached a predetermined limited capacity, and when it is judged that the predetermined limited capacity has been reached, an identifier indicating an editing-inhibited state is added to the database, to inhibit all editing actions to the database, thereby achieving the user-friendly system.

6 Claims, 5 Drawing Sheets

DOCUMENT MANAGEMENT SYSTEM, DOCUMENT MANAGEMENT METHOD, PROGRAM AND STORAGE MEDIUM

This application is a continuation of U.S. patent application Ser. No. 10/400,640, filed Mar. 28, 2003 (allowed), the contents of which are incorporated by reference herein.

BACKGROUND OF THE INVENTION

1. Field of the Invention

The present invention relates to a document management system for registering and managing a document in a relational database.

2. Related Background Art

Conventionally, in a document management system using a relational database, in a case where a capacity of the database exceeds a limited recordable capacity, when a user tries to register a document, the document management system requires the user to delete a portion of the data being saved.

In the conventional document management system, when a plurality of users share the database, there were cases where some user required to delete data would delete the data at his/her own discretion, causing confusion among the users.

Further, at the time when the user gives an instruction to register data, he/she would first learn that the database is in a state in which a document cannot be registered, and thus the system was difficult to use.

SUMMARY OF THE INVENTION

According to the present invention, for example in a case where a database capacity has reached a predetermined size, editing processes such as registering, deleting and replacing data can no longer be performed, thereby achieving the user-friendly system.

According to the present invention, there is provided a document management system for registering and managing a document in a database of a relational database server, the system including:

judging means for judging whether or not a capacity of the database has reached a predetermined limited capacity; and inhibiting means for adding to the database an identifier indicating an editing-inhibited state so as to inhibit all editing actions to the database, when the judging means judges that the capacity of the database has reached the predetermine limited capacity.

According to the present invention, there is provided a document management method for registering and managing a document in a database of a relational database server, the method including:

judging whether or not a capacity of the database has reached a predetermined limited capacity; and performing inhibition while adding to the database an identifier indicating an editing-inhibited state so as to inhibit all editing actions to the database, when that the capacity of the database has reached the predetermine limited capacity is judged in the judging.

Other features and advantages of the patent invention will be apparent from the following description taken in conjunction with the accompanying drawings, in which like reference characters designate the same or similar parts throughout the figure thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Figure 1:
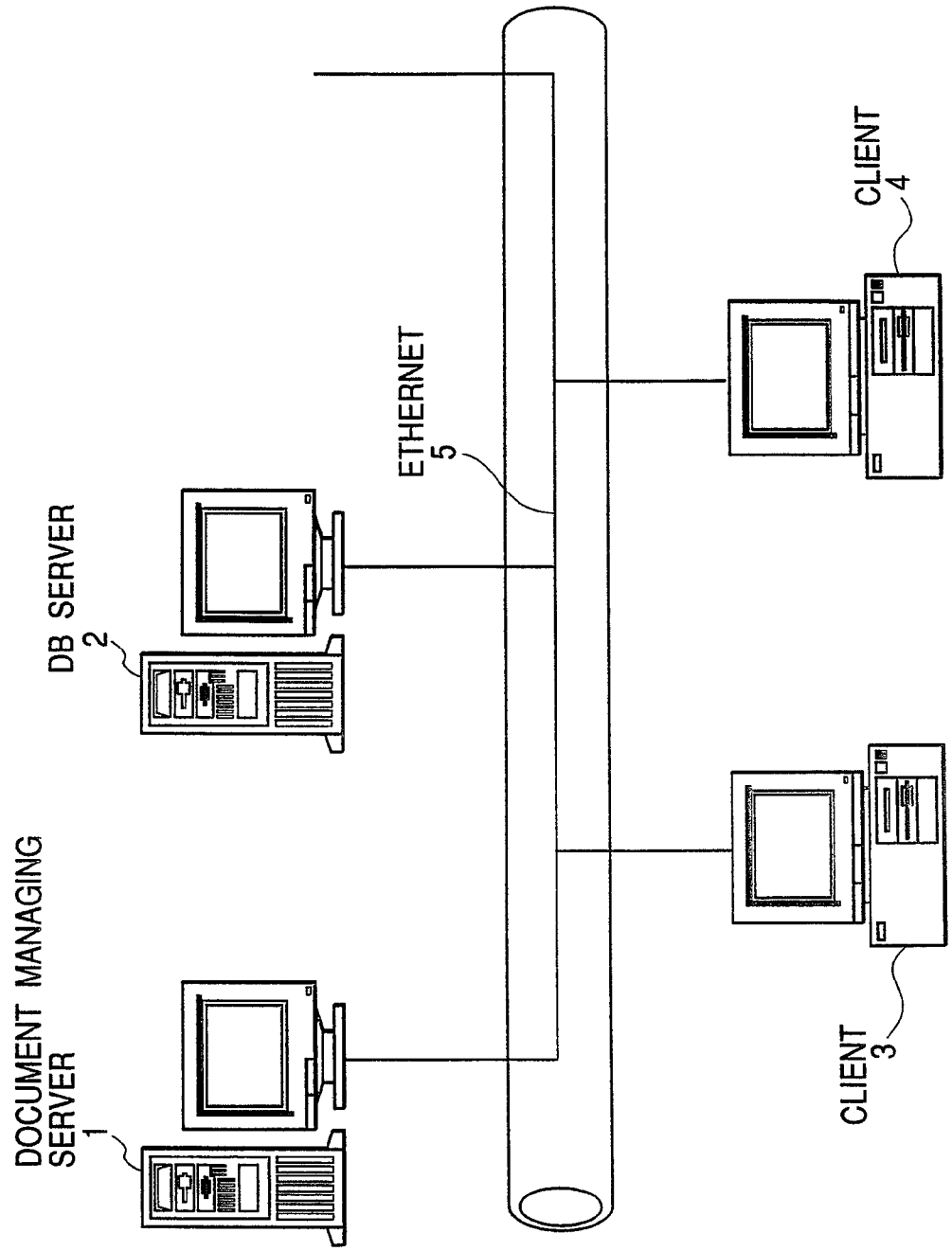
FIG. 1 shows a configuration of a document management system.

FIG. 1 shows a configuration of a document management system of this embodiment. In accordance with this embodiment, a document managing server 1, a relational database server 2, document managing clients 3 and 4, and the like are connected to an Ethernet (R) 5. Here, the document managing server 1 is configured such that it can perform communications with the relational database server 2 and the document clients 3 and 4 via the network. Then, when there is a process request from the document managing client 3 or 4, the document managing server 1 can interpret the content of the request and can read/write document data with respect to the relational database server.

The relational database server 2 stores a database that is used in the present invention.

The document managing clients 3 and 4 can give the document managing server 1 instructions to register and read the document data.

Note that, the document managing server, the relational database server, and the document managing clients of this embodiment are realized by means of a program operating on a computer. However, the computer may be configured with a single device, or may be configured with a plurality of devices. Further, the computer is constituted by: a CPU for performing overall control of this apparatus according to a document management control program which corresponds to a flowchart described below; a RAM, a ROM, a hard disk, or a removable storage medium used as storage means; a display for performing a display; a keyboard and a pointing device for transmitting instructions from a user; a network interface for communications with the external, and the like. Note that, the document management control program used in this embodiment may be stored in the ROM, the hard disk, or other such internal storage media, it may also be stored on a Floppy (R) disk, a CD-ROM, or other such external storage media to be read and executed as needed, and it may also be received from an external device via the network to be executed. Further, in accordance with this embodiment, the document managing server and the relational database server operate on separate computers, but they may also be configured to operate on the same computer.

Figure 2:
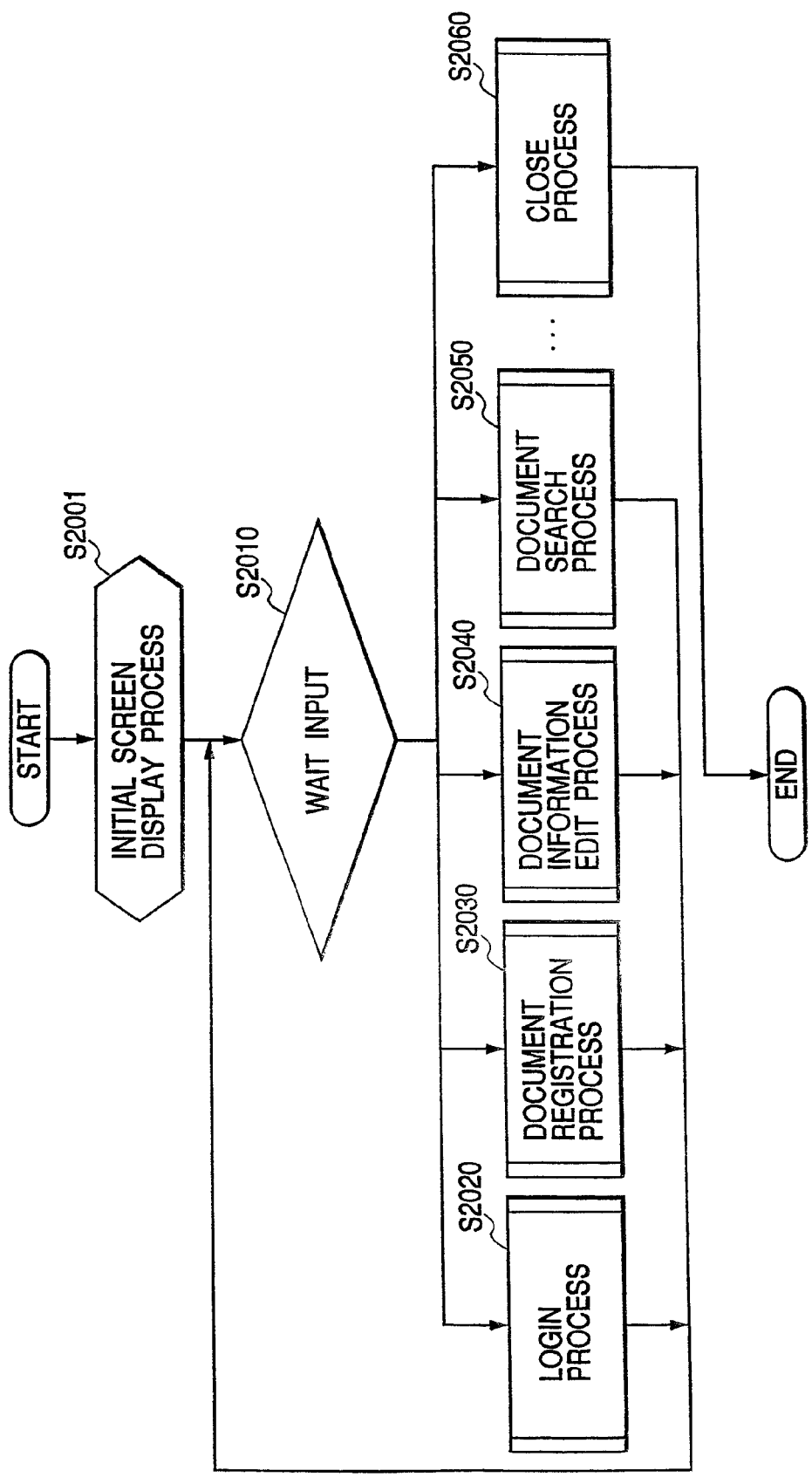
FIG. 2 is a flowchart of processes executed by a document managing client.

FIG. 2 is a flowchart for explaining processes executed by the document managing client.

Step S2001 is an initialization process for building a screen and the like, which is performed at a time when the document managing client is booted.

Step S2010 is a branching process for interpreting an input operation by the user, and depending on the content of the operation, branching the processing into steps corresponding to operations.

Step S2020 is a process performed at a time when the user performs a database login process. Detailed content of this process is explained below using FIG. 3.

Step S2030 is a process performed in a case where the user performs a document registration process. The document registration process refers to an editing process, in which a file of a file system browsable from the computer where the document management client program is operating is registered into the relational database server 2 via the document managing server 1. Detailed content of this editing process is explained below using FIG. 4.

Step S2040 is a process for performing editing (registration, deletion, replacement, and other such alterations) to document information which is displayed by the user giving an instruction to display the document information that is stored in the database in correspondence with the document. The document information is displayed per document, and in a case where the document information has been edited, the edited document information is written back into the database.

Note that, in a case where the database has already changed to an editing-inhibited state, when the document information is displayed, an edit menu of a user interface is displayed so that the user understands that editing is not possible (for example, a menu item for performing the editing processes is grayed out to clearly indicate that it cannot be used). The editing processes for registration, deletion, replacement, and the like in step S2030 and step S2040 cannot be executed in the database.

Step S2050 is a process performed when the user has executed a document search operation. Here, when the document search instruction is received from the user, a document search screen is displayed, and a document search can be performed. The document search screen is configured such that the document information can be inputted as search information. As a result of the search, if documents are found, a list of the documents found by the search is displayed on a search results screen. As a result of the search, if documents are not found, a message indicating this is displayed, and the control is returned to the document search screen.

Step S2060 is a process performed when the user performs a closing process. A process for disconnection from the connected database (a logout process) is performed, and the program is ended.

Figure 3:
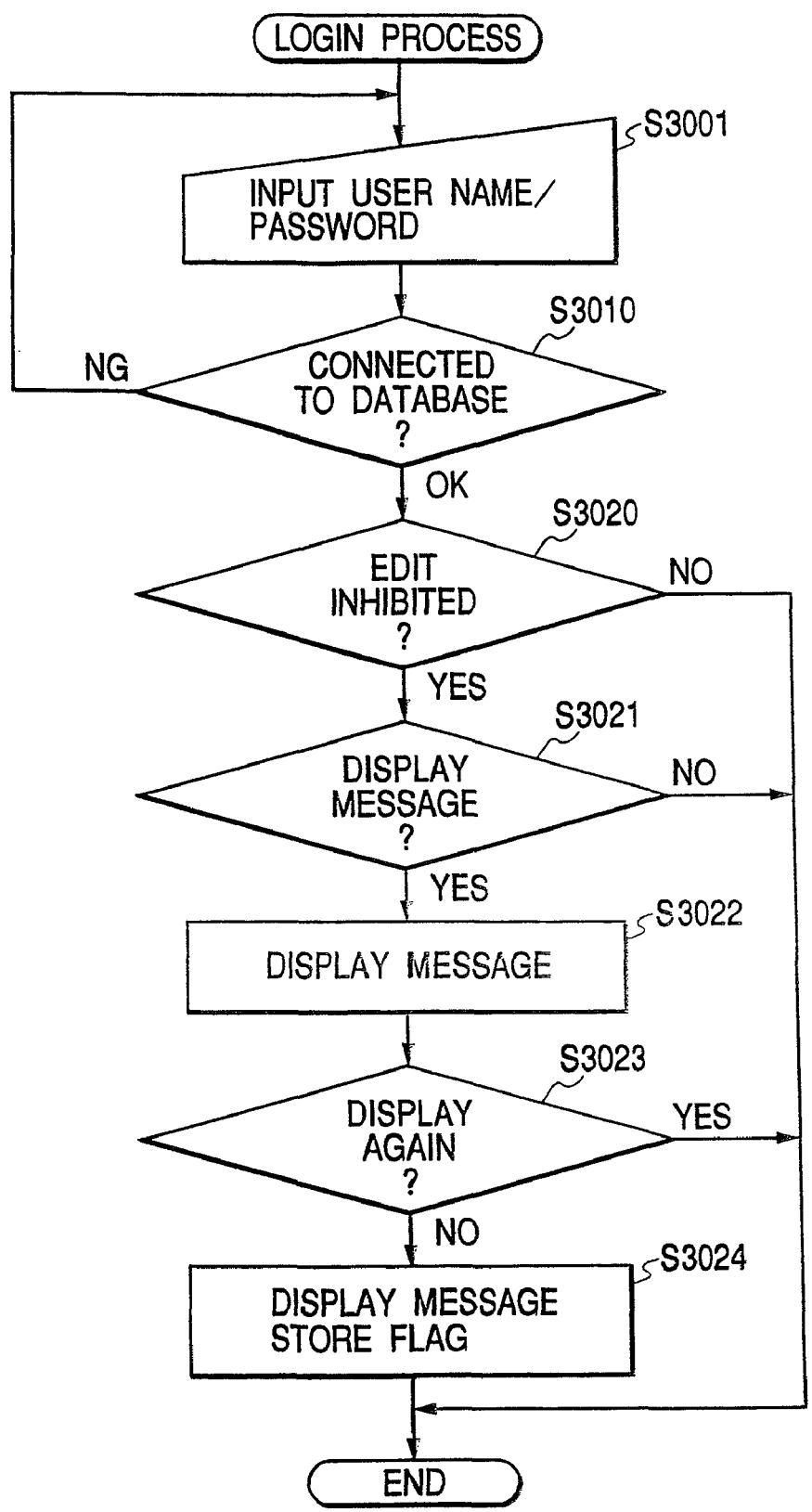
FIG. 3 is a flowchart of a login process.

FIG. 3 is a flowchart for explaining a process at a time when the user performs the login operation.

Step S3001 is a process for requiring the user to input a user name and a password for connecting to the database which is to be logged into.

In step S3010, a verification process is performed for verifying whether or not the user name and the password inputted at step S3001 can be used to perform the connection to the database. If it is judged that the connection is made successfully, the processing advances to step S3020, and if the connecting cannot be achieved, then a message indicating that the verification failed is displayed, and the processing returns again to step S3001, and the user is asked to re-input the user name and the password.

At step S3020, a judgment is made as to whether or not the database is in the editing-inhibited state, and the processing branches off depending on the result of the judgment. In a case where the database is not in the editing-inhibited state, the login processing ends, and the database browsing process and the editing processes such as registering, deleting and replacing documents become executable. On the other hand, in a case where the database is in the editing-inhibited state, the editing processes such as registering, deleting and replacing documents become unexecutable, and the processing advances to step S3021. Note that, the judgment of whether or not the database is in the editing-inhibited state is performed based on an editing-identification identifier, which is saved in the database. Note that, in the case where the database is already in the editing-inhibited state, the display to that effect is made on the user interface of the client such that the user understands that the editing cannot be performed (for example, the menu item for performing the editing process is grayed out to clearly indicate that it cannot be used).

At step S3021, a message display flag is confirmed, and in a case where the message display flag is set ON, the processing advances to step S3022, and in a case where it is not set ON, the processing ends. The message display flag is saved in a non-volatile storage area and maintained even after the program is ended, and it can also be referenced at subsequent times when the program is loaded. In its initial state, the flag is set so as to be displayed (the ON state).

At step S3022, a message for informing the user that the database is in the editing-inhibited state is displayed on the message display screen. At this time, a check box as to whether or not the same message should be displayed each time the editing action is to be performed at the subsequent time forward is provided in the message display screen.

At step S3023, the processing branches off depending on whether or not the user selected at step S3022 the check box as to whether or not to display the same massage at the subsequent time forward. In a case where the same message is to be displayed at the subsequent time forward, the process ends, and in the case where the user selected the check box indicating that display of the message at the subsequent time forward is unnecessary, the processing advances to step S3024.

At step S3024, the message display flag is set OFF (not to display the message), and the message display flag is saved.

Figure 4:
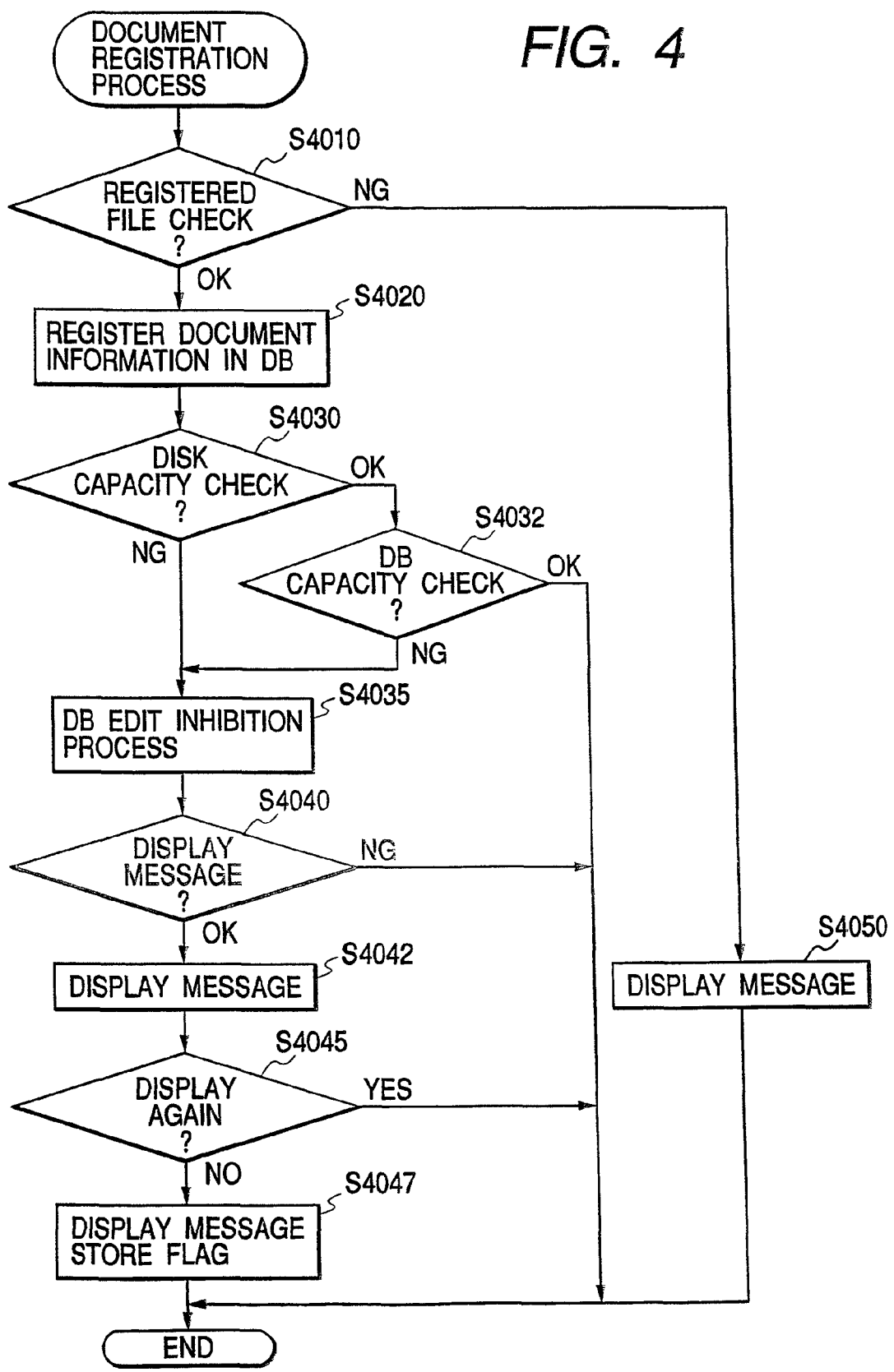
FIG. 4 is a flowchart of a document registration process.

FIG. 4 shows a process performed by the document managing server 1 at a time when the user performs a document registration process operation. The target document of the registration in the file system of the client has been indicated by the user before performing the process.

Step S4010 is a process for confirming whether or not to save the indicated document in the file system of the client. If the document is not to be saved, a message indicated this is displayed at step S4050, and the process ends.

At step S4020, the designated document is obtained from the document managing client, and a process for registering the document into the database of the database server is performed.

At step S4030, the capacity of the disk on which the database is stored is confirmed, and in a case where there is a remaining capacity, the processing advances to step S4032, and in a case where there is no capacity remaining, the processing advances to step S4035.

At step S4032, it is judged whether or not the database capacity has reached a predetermined limited capacity, and in a case where the predetermined limited capacity has been reached, the process advances to step S4035, and in a case where the predetermined capacity has not been reached, the processing ends. Note that, the predetermined limited capacity is a fixed value predetermined based on the capacity allowable for the document managing program of this embodiment.

At step S4035, the editing-identification identifier for indicating the editing-inhibited state is saved in the database so as to put the database in the editing-inhibited state.

At step S4040, the message display flag is confirmed, and in the case where the message display flag is ON, the processing advances to step S4042, and in the case where the message display flag is OFF, the process ends.

At step S4042, a control is performed for a message display in the display screen of the document managing client, indicating that the database is set in the editing-inhibited state. Note that, when the client receives this message, the control is performed such that the user understands that the editing cannot be performed on the user interface of the client (for example, the menu item for performing the editing process is grayed out to clearly indicate that it cannot be used). At this time, in the message display screen there is provided a check box as to whether or not to display the same message each time the editing action is to be performed at the subsequent time forward.

Step S4045 is a process through which the processing branches off depending on whether or not the user selected at step S4042 the check box to display the same message each time the editing action is to be performed at the subsequent time forward. In the case where the message is to be displayed at the subsequent time forward, the process ends, and in the case where the message is not to be displayed at the subsequent times, the process advances to step S4047, and the message display flag is set not to display the message, and this condition is saved.

Embodiment 2

In accordance with Embodiment 1 above, the limited capacity used in step S4032 in FIG. 4 to confirm whether or not the capacity of the database reaches the predetermined limited capacity is determined as the predetermined fixed value. However, the limited capacity may also be set at a value desired by the user. In such a case, a user interface program for setting the limited capacity before the document registration process is provided separately.

Embodiment 3

Figure 5:
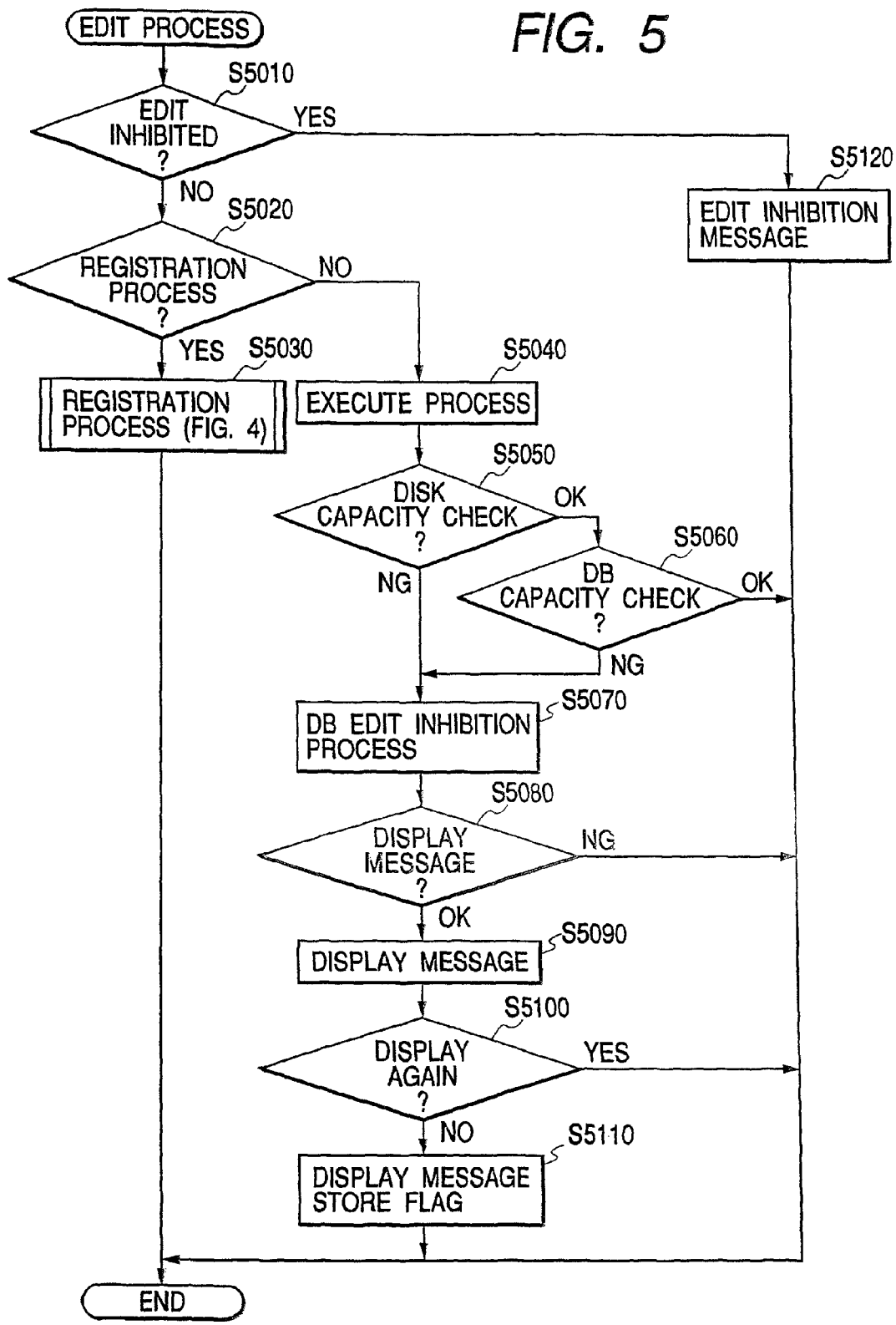
FIG. 5 shows another embodiment at a time when an instruction is given for an editing process such as registering, deleting or replacing a document.

In accordance with Embodiment 1, when the editing-identification identifier is applied to the database and the database enters the editing-inhibited state, the menu items for performing the editing processes (registration, deletion, replacement, alteration, etc.) are grayed out on the client side, to prevent all editing actions. In accordance with Embodiment 3, in addition to the characteristics of Embodiment 1, a description will be given of a case in which, when the instruction for editing is sent even though the database is in the editing-inhibited state and the display shows that the editing actions cannot be performed, a warning message indicating the editing-inhibited state is displayed, and the program is ended without performing the editing process. FIG. 5 is a flowchart indicating a process of the document managing server according to this embodiment.

When an editing instruction for registration, deletion, replacement, alteration or the like is given, at step S5010, it is judged whether or not the editing-identification identifier has been applied to the database, and in a case where it is judged that it has been applied, at step S5120, a control is performed such that the client displays the warning message that the database is in the editing-inhibited state, and the editing process is not performed.

On the other hand, in a case where it is judged that the editing-identification identifier has not been applied to the database, if the editing instruction is for the registration process, the same processing as in FIG. 4 is executed at step S5030. In a case where another editing process for deletion, replacement, alteration or the like has been instructed, at step S5040, the editing process is executed. After that, in a case where it is judged at step S5050 and step S5060 that the disk capacity or the database capacity has exceeded the predetermined limited value, at step S5070, the editing-identification identifier indicating the editing-inhibited state is saved in the database so that the database enters the editing-inhibited state. Since the processes of steps S5080 through S5110 are similar to the processes of steps S4040 through S4047 in FIG. 4, explanations thereof are omitted.

As described above using Embodiments 1 through 3, in accordance with the present invention, in the case where the database capacity has exceeded the predetermined limited capacity, all the editing actions such as writing and deleting to/from the database are inhibited, whereby confusion of the user can be prevented.

Further, in the case where the editing actions are inhibited, the display to that effect is made while the edit menu is grayed out, for example, whereby the user can easily distinguish whether or not the database is allowed for the editing action, before performing editing instruction.

What is claimed is:

1. A document management system comprising:
   a storage medium which stores documents;
   a judging unit which judges whether a capacity of the storage medium has reached a predetermined limited capacity, when a registration instruction of a document from a user of a client is performed; and
   a control unit which controls the client to display information indicating that the user of the client cannot request the document management system to delete any one of the stored documents, when the judging unit judges that the capacity of the storage medium has reached the predetermined limited capacity,
   wherein the user of the client can request the document management system to delete any one of the documents stored in the storage medium, when the judging unit judges that the capacity of the storage medium has not reached the predetermined limited capacity.

2. A document management system comprising:
   a storage medium which stores documents;
   a judging unit which judges whether a capacity of the storage medium has reached a predetermined limited capacity; and
   a control unit which controls processing such that deletion of the stored documents is inhibited, when the judging unit judges that the capacity of the storage medium has reached the predetermined limited capacity and such that deletion of the stored documents is not inhibited, when the judging unit does not judge that the capacity of the storage medium has reached the predetermined limited capacity.

3. A document management method comprising:
   using a computer to store documents in a storage medium;
   judging whether a capacity of the storage medium has reached a predetermined limited capacity, when a registration instruction of a document from a user of a client is performed; and
   controlling the client to display information indicating that the user of the client cannot request the computer to delete any one of the stored documents, when it is judged that the capacity of the storage medium has reached the predetermined limited capacity,
   wherein the user of the client can request the computer to delete any one of the documents stored in the storage medium, when it is judged that the capacity of the storage medium has not reached the predetermined limited capacity.

4. A document management method comprising:

using a computer to store documents in a storage medium;

judging whether a capacity of the storage medium has reached a predetermined limited capacity; and controlling processing such that deletion of the stored documents is inhibited, when it is judged that the capacity of the storage medium has reached the predetermined limited capacity and such that deletion of the stored documents is not inhibited, when it is not judged that the capacity of the storage medium has reached the predetermined limited capacity.

5. A computer-executable program stored on a computer-readable memory medium, said computer-executable program being executable by a computer so as to control the computer to execute a document management method, said document management method comprising:

using the computer to store documents in a storage medium;

judging whether a capacity of the storage medium has reached a predetermined limited capacity, when a registration instruction of a document from a user of a client is performed; and controlling the client to display information indicating that the user of the client cannot request the computer to delete any one of the stored documents, when it is judged that the capacity of the storage medium has reached the predetermined limited capacity, wherein the user of the client can request the computer to delete any one of the documents stored in the storage medium, when it is judged that the capacity of the storage medium has not reached the predetermined limited capacity.

6. A computer-executable program stored on a computer-readable memory medium, said computer-executable program being executable by a computer so as to control the computer to execute a document management method, said document management method comprising:

using a computer to store documents in a storage medium;

judging whether a capacity of the storage medium has reached a predetermined limited capacity; and controlling processing such that deletion of the stored documents is inhibited, when it is judged that the capacity of the storage medium has reached the predetermined limited capacity and such that deletion of the stored documents is not inhibited, when it is not judged that the capacity of the storage medium has reached the predetermined limited capacity.

\* \* \* \* \*